(12) United States Patent
Helenelund et al.

(10) Patent No.: US 9,188,599 B2
(45) Date of Patent: Nov. 17, 2015

(54) ADJUSTABLE MOTION DETECTOR

(71) Applicant: Oy Baltic Instruments Ab, Hamari (FI)

(72) Inventors: Christer Helenelund, Hamari (FI); Anders Viktor Thoreson, Hamari (FI)

(73) Assignee: Oy Baltic Instruments Ab, Hamari (FI)

( * ) Notice: Subject to any disclaimer, the term of this patent is extended or adjusted under 35 U.S.C. 154(b) by 0 days.

(21) Appl. No.: 14/032,204

(22) Filed: Sep. 20, 2013

(65) Prior Publication Data

US 2014/0083188 A1 Mar. 27, 2014

(51) Int. Cl.
*G01P 1/00* (2006.01)
*G01P 1/02* (2006.01)
*G01P 13/00* (2006.01)

(52) U.S. Cl.
CPC ................ *G01P 1/023* (2013.01); *G01P 13/00* (2013.01)

(58) Field of Classification Search
CPC .................................. G01P 1/02; G01P 1/023
USPC .............. 73/652, 654, 661, 866.5, 35, 178 R, 73/514.01, 493–494; 701/207, 210, 214, 701/220
See application file for complete search history.

(56) References Cited

U.S. PATENT DOCUMENTS

| 4,905,518 | A | 3/1990 | Kuebler | |
| 7,003,399 | B1 * | 2/2006 | Chappell | ....................... 701/500 |
| 2006/0237608 | A1 | 10/2006 | Hanson et al. | |
| 2007/0074582 | A1 | 4/2007 | Santos et al. | |
| 2007/0074583 | A1 | 4/2007 | Santos et al. | |
| 2007/0262259 | A1 | 11/2007 | Wu et al. | |

FOREIGN PATENT DOCUMENTS

| GB | 2443018 A | 4/2008 |
| JP | 2000230936 A | 8/2000 |

\* cited by examiner

*Primary Examiner* — Eric S McCall
*Assistant Examiner* — Anthony W Megna Fuentes
(74) *Attorney, Agent, or Firm* — Seppo Laine Oy

(57) ABSTRACT

The invention relates to a motion detector comprising at least of one accelerometer and corresponding control electronics encapsulated in an enclosure with means for attaching the enclosure to a moving body. In accordance with the invention the motion detector includes means for turning, aligning and locking the detector in any desired direction relative to the moving body with the help of the enclosure.

9 Claims, 5 Drawing Sheets

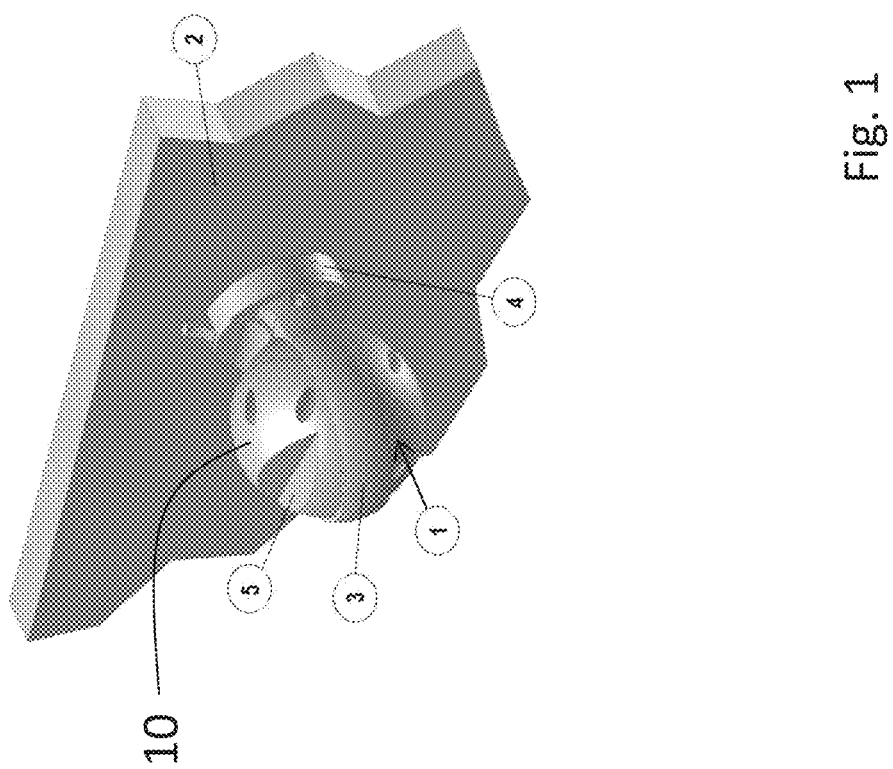

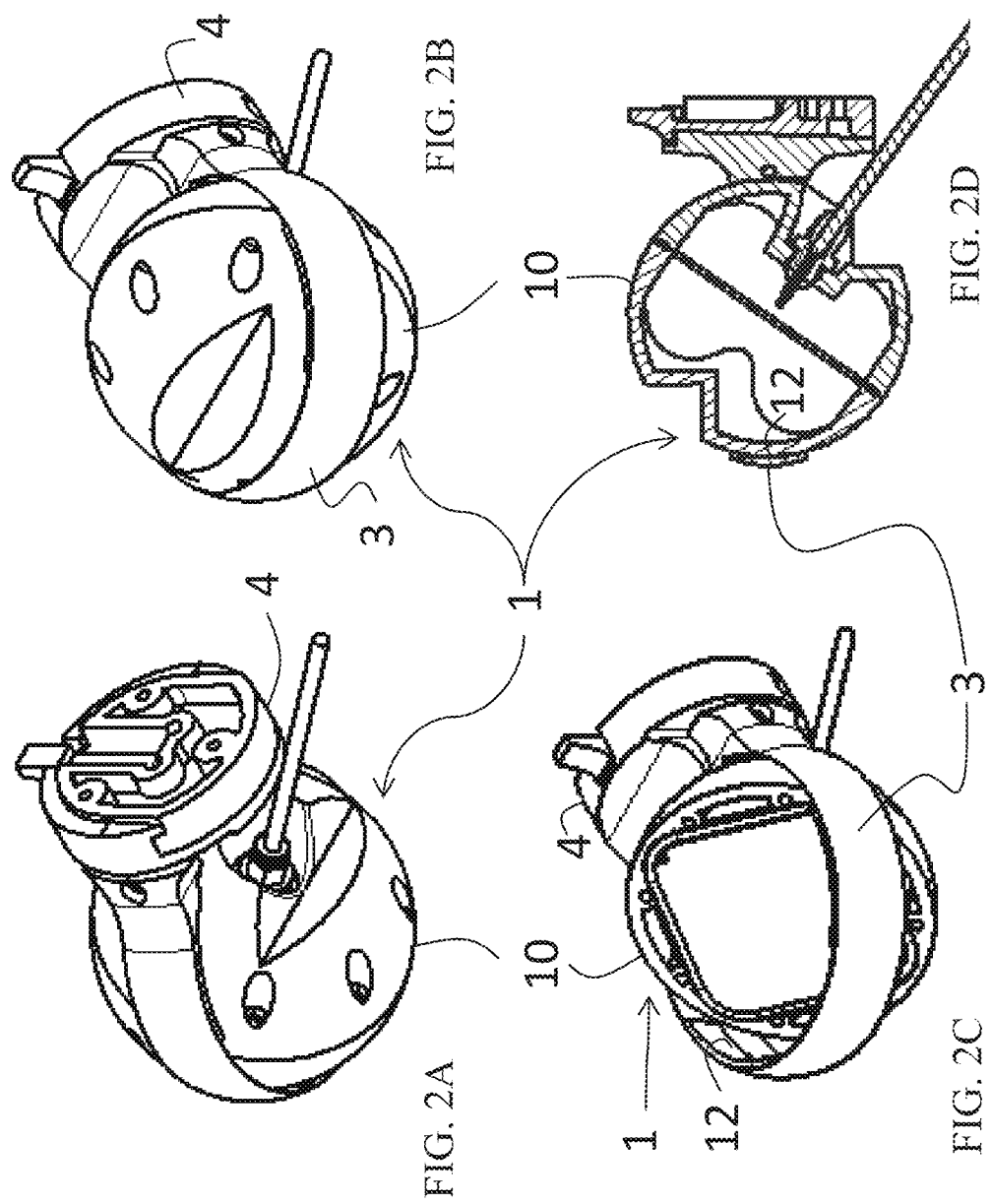

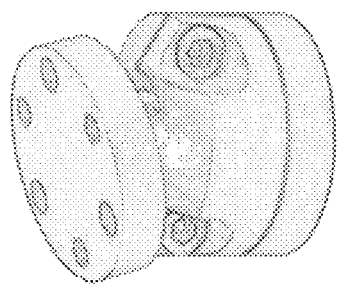
Fig. 6
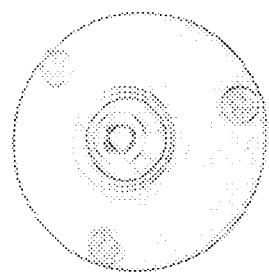
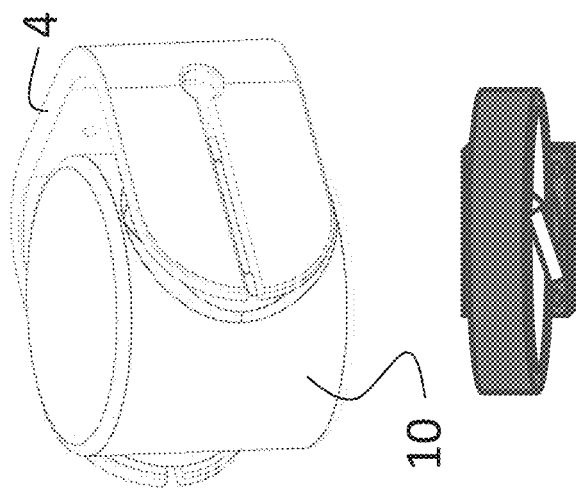
Fig. 5

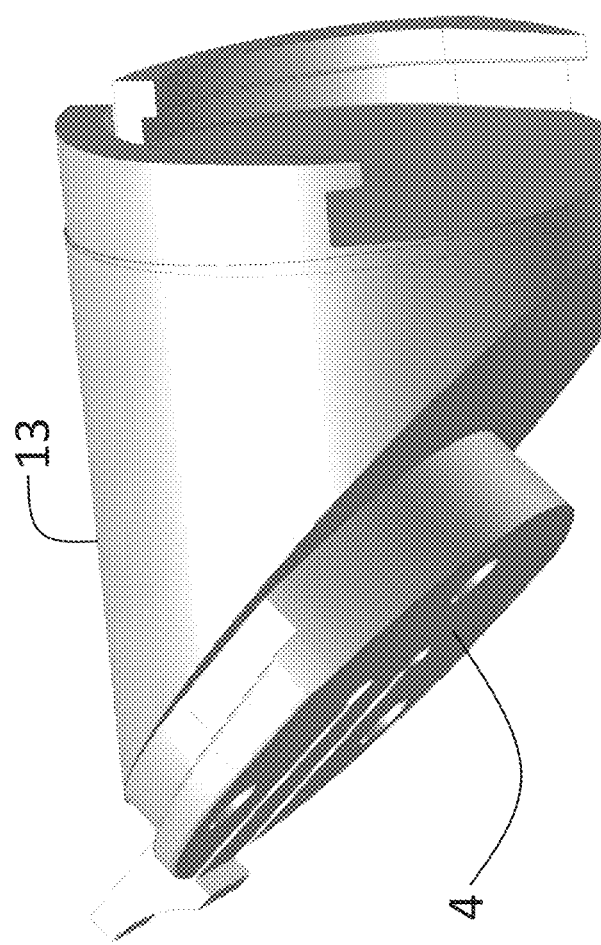

ADJUSTABLE MOTION DETECTOR

BACKGROUND OF THE INVENTION

The invention comprises means for encapsulating and attaching a motion detector on surfaces of practically any orientation, whereas the detector thereafter easily can be turned, aligned and locked into a direction that is advantageous for the measurement application. The detector can thereafter easily and rapidly be removed and reinstalled without further need for re-alignment. The aim with the invention is to essentially lower the cost of installation and ownership and through a more accurate initial positioning form a basis for an installation calibration resulting in a better performance of the measurement.

In many measurement applications it is difficult to find a good location where the sensor or measurement instrument can be installed. Depending on the type of sensor and the measurement application it sometimes might be advantageous to install the unit in a location only surrounded by inclined surfaces, despite that the proper functionality would require the sensor to be turned differently. This is especially the case with motion detectors which, depending on the setup, should be installed in a particular location and/or direction relative to the body which motions will be measured. With a motion detector we here mean a sensor consisting either of either

- a one, two or three dimensional accelerometer,
- the aforesaid accelerometer with a one, two or three dimensional gyro,
- the aforesaid accelerometer with a one, two or three dimensional magnetometer or
- the aforesaid accelerometer with a one, two or three dimensional gyro and with a one, two or three dimensional magnetometer In the three latter cases the measurement axis or axes of the gyro, the magnetometer or both are assumed to be parallel with one, two or three of the accelerometer's axes. With a three dimensional accelerometer we understand a device that has three accelerometers, the measurement axes of which are perpendicular to each other. With a three dimensional gyro we understand a device that has three gyros, the measurement axes of which are perpendicular or in known angles to each other. Consequently a three dimensional magnetometer is a device that has three magnetometers, the measurement axes of which are perpendicular to each other. Correspondingly a two dimensional accelerometer or gyro or magnetometer has two axes which are perpendicular to each other.

Although there are motion detectors for many applications, the majority of motion detectors on the market are encapsulated in traditional box shaped enclosures intended for direct mounting on a flat surface. Sometimes these enclosures have mounting flanges or ears, which enable attachment on the wall without the need to open the detector cover. Also motion detectors with cylindrically shaped enclosures with or without mounting flanges are available. Some of the mounting flanges or ears have extended holes or grooves in order to enable fine adjustment.

Box shaped or cylindrical motion detector enclosures are well suited for many applications, but sometimes there is a need to install the detector on an inclined surface and if this is the case the detector must, depending on the application, often be installed on a wedge-shaped support or with long screws with nuts for fine adjustment or alternatively the measured motions must afterwards numerically be converted to another coordinate system. All three options solve the measurement problem technically, but add complexity to the installation. A wedge-shaped support or long screws with nuts might easily also be considered as makeshifts or temporary. Numerical conversion on the other hand requires measurement of the mounting angle, feeding in this info into the processing system and more data processing. The latter could also be accomplished by using of some kind of automatic re-calibration, but also this requires time, knowledge on the status of the body on which the motion detector is attached, caution and obviously also additional data processing. If the body is a vehicle, boat etc. re-calibration can typically only be done when the body is stationary or in another known state.

In conclusion—If highest possible measurement performance is required and if motion detectors with traditional enclosures must be installed on inclined surfaces, this installation work can in practice currently only be accomplished by a professional technician, who carefully takes the special conditions into consideration. This increases the overall system price and which is especially noticeable in systems intended for price critical volume or consumer applications such as small or medium sized yachts and boats.

SUMMARY OF THE INVENTION

By means of the intention we can
1) obtain additional flexibility when selecting a suitable spot for installing the motion detector
2) simplify the installation so that end users can themselves install the motion detectors. This will make the overall system more affordable also for the use in price critical volume applications such as small or medium sized yachts and boats
3) obtain a better numerical re-calibration and thus also a better accuracy of the motion measurement due to the improved capability to align and adjust the detector mechanically
4) enable removal and re-installation of the motion detector without the need for re-alignment, re-adjustment and numerical re-calibration To achieve the best performance a motion detector must be re-calibrated prior to initial use, eliminating alignment errors generated during the installation. Such errors are most typically caused by installing the motion detector either on an inclined surface or due to that the alignment relative to the moving body has not been very exact. Such conditions might occur when a motion detector is installed on a bulkhead or balk in a yacht or boat. Correcting these angle errors would require either some kind of mechanical solution for leveling or aligning the unit or then alternatively some kind of re-calibration, or for best performance both. The challenge is to do this in a cost efficient way.

To achieve the best accuracy and performance in cases where the motion detector is installed on an inclined surface we need to:
A) To have an enclosure that enables easy leveling or alignment after the motion detector has been attached on the moving body 2
B) Efficiently re-calibrate the unit in order to compensate for the remaining alignment errors There are several ways of mechanically accomplishing item A. One such adjustable structure is suggested in FIGS. 1 and 2. After the attachment base 4 of the detector enclosure has been attached on the wall or the inclined surface, the spherical measurement unit 1 can easily be turned, aligned and locked by the expandable and retractable ring structure 3 towards a direction that is most advantageous for the particular measurement application. In many applications, including but not limited to the yacht and boat application, it might be advantageous to turn the measurement unit 1 of the motion detector so that I) one axis of the detector is parallel with the vessel's longitudinal roll axis and another parallel with the vessel's transverse pitch-axis II) all three axes of the motion detector are pointing in given angles relative to the gravity vector, preferably all three axes equally sideways downwards relative to the gravity vector, as shown in FIG. 3. The angle between the gravity vector and each of the motion detector's axes would in such a setup ideally be approximately 35.3°, provided of course that the three axes of the motion detector are perfectly perpendicular with each other. By this setup all three accelerometer axes will at the same time be strongly sensitive to gravity, opposite to a setup where only one axis is parallel and the two others perpendicular to the gravity vector. The latter setup is not especially good for further manual or automatic re-calibration as small angle changes hardly will generate any changes in the accelerometer readings.

A motion detector can also be turned, aligned and locked by means of other enclosure solutions. Examples on such solutions are structures based on lockable ball joints, hinges or gimbaled structures.

Let's have a look at case II in more detail. After the motion detector has been attached on the moving body 2, the measurement unit 1 is turned and aligned so that all three mutually perpendicular axes of the motion detector are as accurately as possible pointing equally sideways downwards relative to the gravity vector as shown in FIG. 3. After this the measurement unit is locked in this position and when the moving body 2 (on which the motion detector has been installed) is in a known and stable state (in a yacht or boat typically in the horizontal floating position), the manual or automatic re-calibration according to item B above is started. During the re-calibration the impact of gravity on the three axes is recorded and average values calculated. Finally the motion detector (or motion measurement) is numerically re-calibrated so that each of the three accelerometer axes will (for the same data set) indicate exactly the same gravity.

In order to minimize the risk for condensation, oxidization and other type of degradation on onboard navigational or electronic equipment it is many times advisable to remove these from the boat during humid or cold seasons or in case the vessel is hauled for the winter. For motion detectors requiring careful alignment or installation this generates an additional challenge. The re-installation must be possible to make so that the position and orientation of the motion detector will be exactly the same as prior to the removal. FIGS. 1, 2 and 4 visualize one solution for such a feature. Similar arrangements can naturally be made by using lockable ball joints, single and/or double hinged or gimbaled solutions for the enclosure.

In more detail the aim is achieved by the invention as defined in the independent claim.

There are several advantages with the invention:

The motion detector can be installed on almost any surface regardless of its orientation.

The motion detector can more easily be located in a spot that is most advantageous for the measurement application.

The simplified installation enables the motion detector to be installed by the end user, reducing the overall system price so that motion detection, motion management or motion control becomes affordable also in ordinary sailing yachts and power boats.

The performance of the motion measurement can be improved as the motion detector can be turned, aligned and locked into a position that is most advantageous for the particular measurement application.

The improved alignment enables a better numerical re-calibration after the installation, based on which also the accuracy of the measurement becomes better.

The motion detector can easily be removed for maintenance or during winter haul and reinstalled without any need for changing the initial position and/or alignment of the motion detector.

The motion detector can be further tilted to a distinct predetermined angle for more comprehensive initial calibration, in cases where still better accuracy is required In regard to the last bullet point the manual or automatic re-calibration according to item B above is made twice; first at the basic locked position and later repeated at a further tilted angle. By doing this the motion detector's alignment can also be characterized around the gravity vector. This can in practice be done by having 1) an extra hinge on the expandable and retractable ring structure 3 or on the attachment base 4 or by having 2) an extra twisted or angled adapter between the expandable and retractable ring structure 3 and the attachment base 4, which is temporarily used during the second re-calibration

BRIEF DESCRIPTION OF THE DRAWING

In the following, the invention is examined with the aid of examples of embodiments according to the accompanying figures.

FIG. 1 shows a perspective view of an embodiment of the invention, e.g, according to claims 1, 2, 4, 6 and 9.

FIG. 2 shows four perspective views of embodiments of the invention, e.g, according to claims 1, 2, 4, 6 and 9.

FIG. 5 shows a perspective view of an embodiment of the invention, e.g, according to claims 3, 5 and 8.

FIG. 6 shows a perspective view of an embodiment of the invention, e.g, according to claim 7.

FIG. 7 shows a perspective view of an embodiment of the invention, e.g, according to claim 9.

DETAILED DESCRIPTION OF EXEMPLARY EMBODIMENTS

Figure 4:
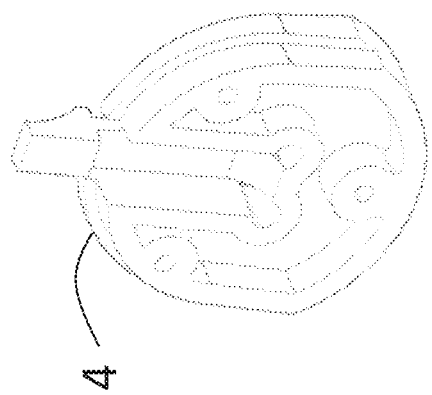
FIG. 4 shows a perspective view of an embodiment of the invention, e.g, according to claim 9.
Figure 3:
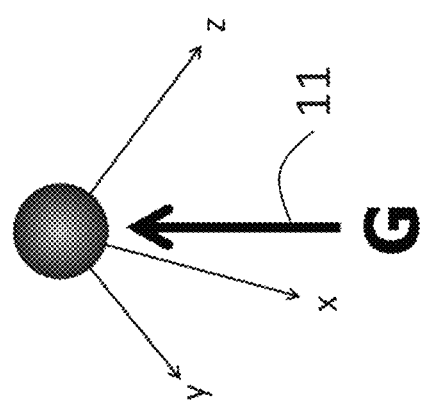
FIG. 3 shows a perspective view of an embodiment of the invention, e.g, according to claim 5.

In accordance with FIGS. 1-7 the invention is typically implemented in the following ways:

In accordance with one preferred embodiment the invention consists of a motion detector 1 comprising of at least one accelerometer and corresponding control electronics encapsulated in an enclosure 10 with mechanical means for attaching the detector to a moving body 2 so that the motion detector can be turned, aligned and locked in any desired direction relative to the moving body 2 with the help of the enclosure 10.

In accordance with one preferred embodiment of the invention the motion detector 1 is characterized by that the support surface 12 between the enclosure 10 and the means for attaching of the enclosure is spherical.

In accordance with one preferred embodiment of the invention the motion detector 1 is characterized by that the support surface between the enclosure and the means for attaching of the enclosure is cylindrical. For this purpose it might be good to have a shallow groove in the cylindrical enclosure where the adjustable fork type of holder, the expandable and retractable ring, cable tie or similar mechanism is located and by means of which the cylinder is more reliably locked axially. To obtain adjustability around an axis perpendicular to the cylinder's main axis a similar setup can be used twice. One or both of the rotational adjustments could as an alternative be obtained using a hinged type of lockable structure as illustrated in FIG. 5.

In accordance with one preferred embodiment of the invention the measurement unit 1 of the motion detector has one or several reference surfaces or slots 5 that can be used as references for aligning (or leveling) the enclosure 10 relative to the moving body 2. Typically a ruler, strait piece of wood, plastic or metal could be inserted or leaned towards the aforementioned reference surfaces or slots in order to improve the accuracy of the alignment.

In accordance with one preferred embodiment of the invention the measurement unit of the motion detector has means for turning, aligning and locking the detector into a given direction relative to the gravity vector. Typically a leveling device could be inserted or leaned towards the aforementioned reference surfaces or slots to improve the accuracy of this alignment.

In accordance with one preferred embodiment of the invention the motion detector 1 is characterized by that the spherical enclosure 10 of the motion detector 1 can be turned and locked into its position by an expandable and retractable ring structure 3. Instead of a ring 3 the spherical detector could be attached and locked by some kind of cable tie, washer or similar type of solution. Any such solution (including the expandable and retractable ring) must be made so robust that the motion detector 1 does not start to vibrate or resonate.

In accordance with one preferred embodiment of the invention the motion detector includes means for turning and locking the detector into its position by means of a lockable ball joint structure (FIG. 6). By means of this solution it might be easy to get any type of motion detector freely adjustable, but the ball joint structure must in such a case be made so large and robust that the motion detector does not start to vibrate or resonate.

In accordance with one preferred embodiment of the invention the motion detector includes means for turning and locking the detector into its position by means of a lockable single or double hinge or gimbaled structure. By means of this solution it might be easy to get any type of motion detector adjustable around by more than one axis, but the hinged or gimbaled structure increase the complexity of the enclosure 10 and the lockable structure must be made so robust that the motion detector does not start to vibrate or resonate.

In accordance with one preferred embodiment of the invention the enclosure 10 of the motion detector includes a separate attachment base 4 enabling the motion detector to be removed from its position on the moving body 2 and re-installed in the same spot without any need for re-alignment or re-adjustment.

In accordance with one preferred embodiment of the invention the motion detector 1 can for calibration be equipped with mechanical means for turning and returning the detector 1 a pre-determined and distinct angle relative to the previously locked position. Typically this could be done by using an additional, twisted or wedge shaped adapter (preferably twisted or angled 20 . . . 90 degrees) between the attachment base 4 and the expandable and retractable ring structure 3. FIG. 7 is illustrating one embodiment of such an adapter 13.

The invention claimed is:
1. A motion detector comprising;
  at least of one accelerometer and corresponding control electronics encapsulated in an enclosure with means for attaching the enclosure to a moving body,
  wherein the motion detector includes means for turning, aligning and locking the detector in any desired direction relative to the moving body with the help of the enclosure, and a support surface which is spherical and located between the enclosure and means for attaching the enclosure and wherein the enclosure can be turned and locked into a position by an expandable and retractable ring structure.
2. The motion detector according to claim 1, wherein the enclosure of the motion detector has at least one reference surface or slot that is capable of being used as a reference for aligning or leveling the enclosure relative to the moving body.
3. The motion detector according to claim 1, wherein the motion detector has means for turning, aligning and locking the detector into a given direction relative to the gravity vector.
4. The motion detector according to claim 1, wherein the motion detector includes a lockable ball joint structure for turning and locking the detector into its position.
5. The motion detector according to claim 1, wherein the motion detector includes a lockable single or double hinged or gimbaled structure for turning and locking the detector into its position.
6. The motion detector according to claim 1, wherein the means for attaching the detector on the moving body includes a separate attachment base enabling the motion detector to be removed from its position on the moving body and re-installed in the same spot without any need for re-alignment, re-adjustment or re-calibration.
7. The motion detector according to claim 1, wherein the motion detector for calibration is equipped with mechanical means for turning and returning the detector a pre-determined and distinct angle relative to the previously locked position.
8. The motion detector according to claim 1, wherein the enclosure is spherical.
9. The motion detector according to claim 1, wherein the means for attaching the enclosure to the moving body is an attachment base.

\* \* \* \* \*